United States Patent [19]

Molis

[11] 4,023,761
[45] May 17, 1977

[54] ADJUSTABLE BRACKET TO STABILIZE UPRIGHT COMPRESSED GAS CONTAINERS AGAINST DISPLACEMENT ON MOBILE VEHICLES AND SHIP-BOARD INSTALLATIONS AND MAINTENANCE SHOPS

[76] Inventor: John Molis, P.O. Box 458, Carson City, Nev. 89701

[22] Filed: June 14, 1976

[21] Appl. No.: 695,524

[52] U.S. Cl. .................. 248/313; 24/278; 211/71; 248/154; 248/316 A
[51] Int. Cl.[2] .................. A47F 5/00; B65D 19/10; F16L 5/00
[58] Field of Search ...... 248/313, 154, 146, 316 A, 248/226 B; 211/71, 75, 88; 24/263 OB, 263 C, 263 A, 278, 135 N, 115 P

[56] References Cited

UNITED STATES PATENTS

| | | | |
|---|---|---|---|
| 1,096,971 | 5/1914 | Van Doren | 24/278 UX |
| 1,286,649 | 12/1918 | Kayser | 248/313 X |
| 2,404,513 | 7/1946 | McCabe | 211/71 |
| 2,615,238 | 10/1952 | Highwood | 248/154 X |
| 3,602,368 | 8/1971 | Gould | 211/71 X |
| 3,643,813 | 2/1972 | Noonan | 248/313 X |
| 3,737,133 | 6/1973 | Boecker | 248/313 |
| 3,765,636 | 10/1973 | Burrell et al. | 248/313 |
| 3,780,972 | 12/1973 | Brodersen | 248/313 |
| 3,791,403 | 2/1974 | Folkerth | 248/313 X |
| 3,921,950 | 11/1975 | Sentinella | 248/313 |

*Primary Examiner*—J. Franklin Foss

[57] ABSTRACT

A pair of braces adjustably mounted on a rigidly supported container-encircling plastic collar and movable into firm engagement with diametrically opposite portions of the periphery of an encircled gas-filled container.

7 Claims, 8 Drawing Figures

ADJUSTABLE BRACKET TO STABILIZE UPRIGHT COMPRESSED GAS CONTAINERS AGAINST DISPLACEMENT ON MOBILE VEHICLES AND SHIP-BOARD INSTALLATIONS AND MAINTENANCE SHOPS

In the art of transporting one or more gas-filled containers in an upright state on mobile carriers, such as on motor trucks operated along streets and highways, or on ship-board or about mantenance shops, it has been the practice theretofore and presently customary to fasten the gas-filled containers by means of heavy steel screw-bolts and nuts to angle-irons or brackets which, in turn, have been welded directly to vertical metal walls, or fastened to wooden walls by means of brackets together with screws and nuts. Frequently, the fastening means have proven unsubstantial and the gas-filled containers have broken loose and have fallen and overturned. These prior installations are disadvantageous in a number of respects, including their clumsiness in handling, and have become damaged especially where the brackets and bolts employed in the installations, are exposed to salt water and salt air, resulting in the accumulation of heavy crusts of rust and the metal caused to erode rapidly. Often, it is necessary to use metal hammers along with crow-bars, or employ hacksaws to effect removal of eroded brackets, angle-irons and bolts in order to replace the damaged parts and to establish proper handling appliances so as to maintain the containers in upright and stable condition for a reasonable length of time. My invention is directed to the provision of a durable light in weight holder which obviates all of the disadvantages of prior installations and which is especially suitable for the movement of gas-filled containers on mobile carriers whereby there is little likelihood of damages thereto or displacement thereof while being transported, and which can be moved about or handled with facility.

A primary object of my present invention is to provide adjusto-brace means for effecting safe transportation of gas-filled containers on mobile carriers and which are highly resistant to erosion; which are relatively easy and inexpensive to manufacture; and which can be installed rapidly in operative assembly for maintaining the upright stability of the containers against swaying, shifting or other displacement during transit.

Another important object of the invention is to provide an adjus-to-brace of the indicated nature for gas-filled containers which is additionally characterized by its increased durability affording appreciably longer service; by its ease of assembly and disassembly; and by its inexpensive maintenance over extensive periods of time.

Other objects of the invention, together with some of the advantageous features thereof, will appear from the following description of an embodiment of the invention which is illustrated in the accompanying drawings and which is an exemplification of the best mode of construction of the invention and of the manner of using the same. It is to be understood that the appended claims are intended to cover the embodiment shown as well as modifications thereof within the scope and purview of the invention.

Referring to the drawings.

Figure 1:
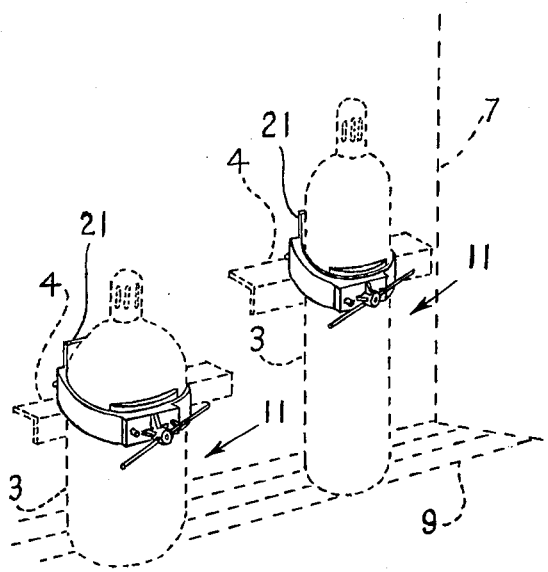
FIG. 1 is a front elevational view of a preferred embodiment of the invention in operative position embracing a pair of gas-filled containers of different diameters; this view illustrating the two different size containers as well as the supporting means, the adjacent wall and the flooring in dotted lines as illustrative of the manner of installation.

In its preferred mode of construction and manner of use, my novel adjus-to-brace for holding gas-filled containers in upright stable condition while undergoing mobile transport preferably comprises, in combination with a gas-filled container alongside a vertical wall and with a vertical flat bar secured to said wall in parallel relatonship thereto, a container-encircling collar, a pair of braces movably mounted on said collar, an arcuate section on each of said braces with its inner face presented to a portion of the periphery of said container at opposite sides thereof, and means for moving one of said pair of braces to bring it arcuate section into engagement with an adjacent portion of the periphery of said container and to press the arcuate section of the other of said pair of braces into bracing engagement with a diametrically opposite portion of the periphery of said container as well as to urge the back portion of said collar into firm engagement with said vertical flat bar.

In the annexed drawings, I have illustrated in dotted lines a plurality of containers 3 of different sizes which are representative of conventional metal cylinders for holding and dispensing a compressed gas of one kind or another used in various industrial environments. I have also shown in dotted lines different types of mounting bar and other supporting aids, such as the angle-irons 4 and the brackets 6 which are usually welded to, or fastened by means of steel screw-bolts, not shown, to a wall or bulk-head 7; the containers 3 being disposed in an upright state on a planar floor 9.

In accordance with my present invention, my unique adjus-to-brace includes a container-encircling collar which is designated generally by the reference numeral 11 and which is preferably molded from a durable plastic material, such as commercially available cycolac, a plastic which is light in weight. Cycolac is sufficiently tough to withstand heavy impacts but any other suitable light in weight plastic can be employed for molding the collar 11, such as a urea or phenol condensate. The collar 11 is conveniently so fashioned so as to form diametrically opposed passages 12 and 13 therein having their axes coaxial with the center of the collar and with one another, and extending through the rear and front of the collar. In addition, the front of the collar 11 is so molded as to provide spaced apart holes 14 and 15 therein on opposite sides of the passage 13, as clearly shown in FIGS. 2 and 3, and extending in parallel relationship with one another; the collar being formed with enlarged sections at the front and back, as indicated by references numerals 16 and 17 to accommodate for the centrally located passages 12 and 13, respectively, as well as for the parallel holes 14 and 15 on opposite sides of the horizontally extending passage 13. Additionally, the molded collar 11 is formed adjacent to the rear 18 thereof, with a vertically extending through slot 19 for passing a standard or upright flat bar 21 which is secured to a vertical wall or bulk-head 7 in parallel spaced relation thereto and which is bevelled at its upper end, as indicated at 22, as an aid for slipping collar 11 thereover so that the slot 19 of the collar is encompassing relation to the bar 21. It is to be noted that the collar 11 is molded to an inner diameter 23 of a sufficient dimension to surround a gas-filled container 3 to be braced and stabilized against displacement and, of course, following usual practices, collars 11 of different sizes or inner diameters can be molded to accommodate these gas-filled containers 3 of different sizes and outer diameters, as indicated at 24.

Figure 2:
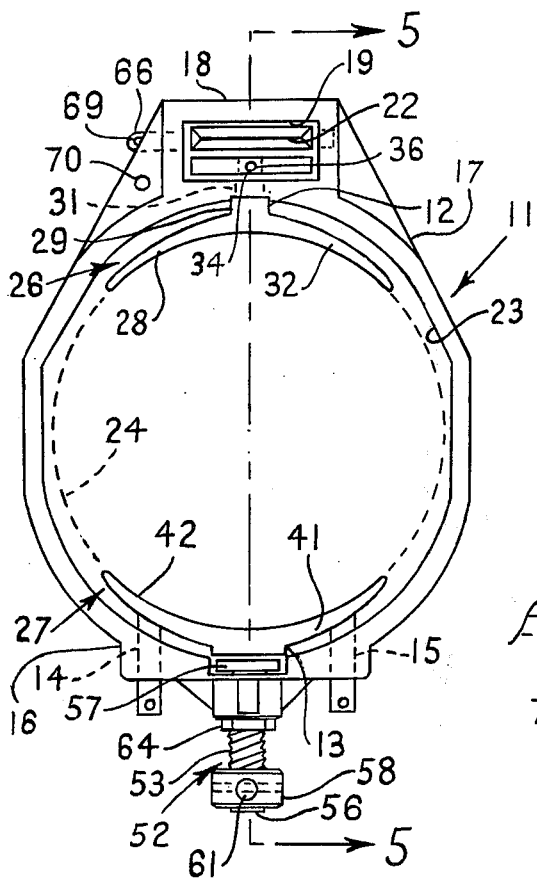
FIG. 2 is a top plan view of the embodimet of the invention shown in reduced elevational view in FIG. 1.
Figure 3:
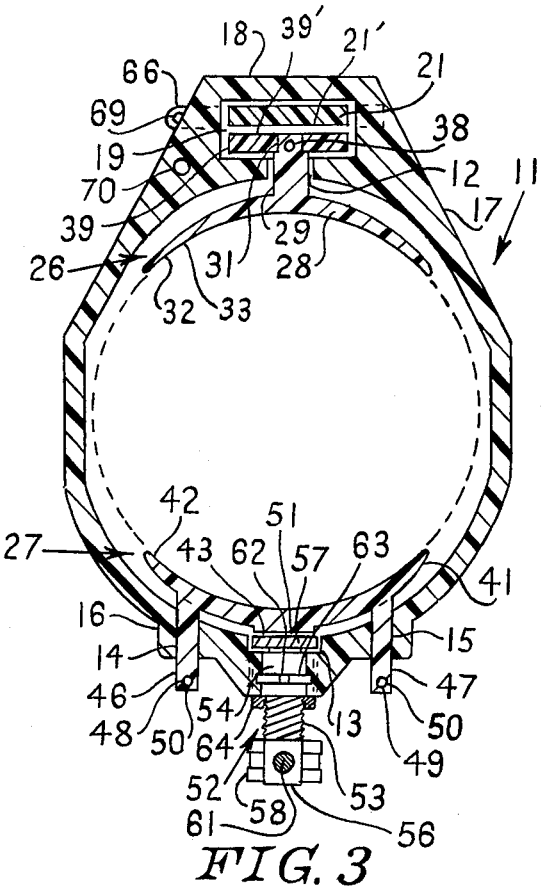
FIG. 3 is a cross-sectional view of a preferred embodiment of the invention; this view being taken on the line 3—3 of FIG. 6.

As shown particularly in FIGS. 2 and 3 of the annexed drawings, a pair of braces 26 and 27 are movably mounted on the collar 11 in opposed relationship to one another and are preferably molded from the same or similar durable plastic material as that used in molding the collar 11. The brace is formed with an arcuate section 28 which merges with a laterally extending round shaft 29 that includes a reduced section 31 thereon; the arcuate section presenting an inner curved face 32 toward the center of the collar and having a curvature conforming to the periphery 33 of the container 3 to be braced. The reduced section 31 of the shaft 29 of the brace 26 is formed with a hole 34 therethrough into which a stainless steel pin is driven to extend through a hole 38 formed in a durable plastic block 39 to thus mount the brace 26 floatingly in the passage 12 of the collar with the platic block 39 retained in the vertically extending slot 19 thereof against the inner wall of slot 19. This floating or movable mounting of the brace 26 allows the periphery of a container 3 to be held against the inner curved face 32 of the brace when brace 27 is moved inwardly to engage an opposite portion of the periphery of the gas-filled container 3, as hereinafter explained, as well as enable the outer surface 39' of the block 39 to be moved into firm engagement with the outer surface 21' of the flat bar 21 to thus hold the container 3 in upright stabilized condition.

As stated above the brace 27 is likewise movably mounted on the collar 11 and is positively advanced inwardly and manually retracted outwardly in passage 13 of the collar when installing the adjus-to-brace of my invention in operative position. The brace 27 likewise is molded from the same or similar durable light weight plastic material as the brace 26 and is so shaped as to provide an arcuate section 41 thereon having its inner curved face 42 presented toward the center of the collar. The brace 27 also is fashioned with a circular boss 43 projecting outwardly from approximately the center of the brace and in axial alignment with the passage 13 of the collar, as well as with a pair of spaced apart guides 46 and 47 which project in parallel relation from the outer surface of the brace and which are formed with holes 48 and 49, respectively, for receiving stainless steel pins 50, after the guides 46 and 47 have been passed through the guides 14 and 15 of the collar, to keep the brace 27 from falling out of the collar while it is empty of a container 3. In mounting the brace 27 in the passage 13, which is accomplished from the inside of the collar, the central boss 43 on the brace enters an enlarged circular recess 51 in the collar at the passage 13 while the two guides 47 and 48 enter the holes.

Slidably fitting within the passage 13 of the collar 11 is a stainless steel jacking-bolt 52 which is provided with external threads 53 for a major portion of its length for engaging internal threads, formed on a stainless steel bushing 54 thereon; the jacking-bolt being provided with an extended shaft 56 on its outer end with an enlarged rounded section 57 on its inner end that seats in the recess 51 of the collar in face-to-face arrangement with the boss 43 on the outer surface of the brace 27. The outer end of the jacking-bolt, designated as the shaft 56 is fitted with an apertured hub 58, and a jacking handle 59 of a similar durable plastic material is pinned to the hub 58 by means of a stainless steel securing pin 61. A notch 62 in the rim 63 of stainless steel bushing 54 serves to hold the bushing in meshing engagement with the outer section 57 of the jacking-bolt 52, and I provide a stainless steel locknut 64 on the bolt to retain the parts in fixed positions when the jacking-bolt is turned up to a definite tightened position.

Turning of the handle 59 in a clock-wise direction will effect movement of the brace 27 inwardly of the collar 11 to bring the inner curved surface 42 of the arcuate section 41 thereof into tight engagement with an adjacent portion of the periphery of a container 3, and at the same time will tighten the opposite portion of the periphery of the gas-filled container 3 against the inner curved surface 32 of the arcuate portion 28 of the opposed brace 26 and in turn tighten the plastic block 39 and back part 18 of the collar 11 against the upright flat bar or standard 21. Counter-clockwise movement of the plastic handle 59 will, of course, loosen the braces 26 and 27 and retract the jacking-bolt 52 so that the collar 11 may be readily lifted off the vertical flat bar 21. This can occur on every occasion that it is desired to replace an emptied container 3 with a newly-filled container.

It is to be observed that the entire operation of installing an adjus-to-brace of my invention in operative position embracing a gas-filled container, with the vertically extending through slot 19 of collar 11 encompassing an upright flat bar 21 and with the arcuate surfaces 32 and 42 of the braces 26 and 27, respectively, jacked up to gripping engagement with opposite portions of the periphery 24 of the gas-filled container 3 and with the inner surface 18' of the rear section 18 of collar 11 pressing the outer side of flat bar 21 against the slidable block 39 by virtue of the action of section 28 of the brace 26, does not take more than a minute or a minute and a half. The removal of the collar 11 from the vertical flat bar 21, after first removing the braces 26 and 27 should take no longer.

Figure 4:
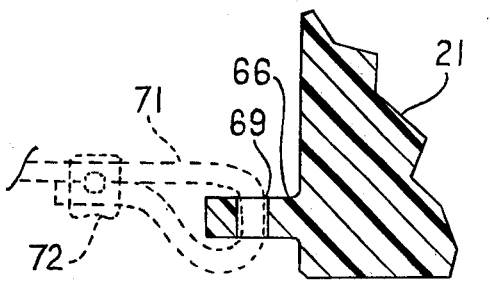
FIG. 4 is a front elevational view, partly in section, of a lashing means for holding the container-encircling collar component of the invention to an upright flat bar component thereof.
Figure 5:
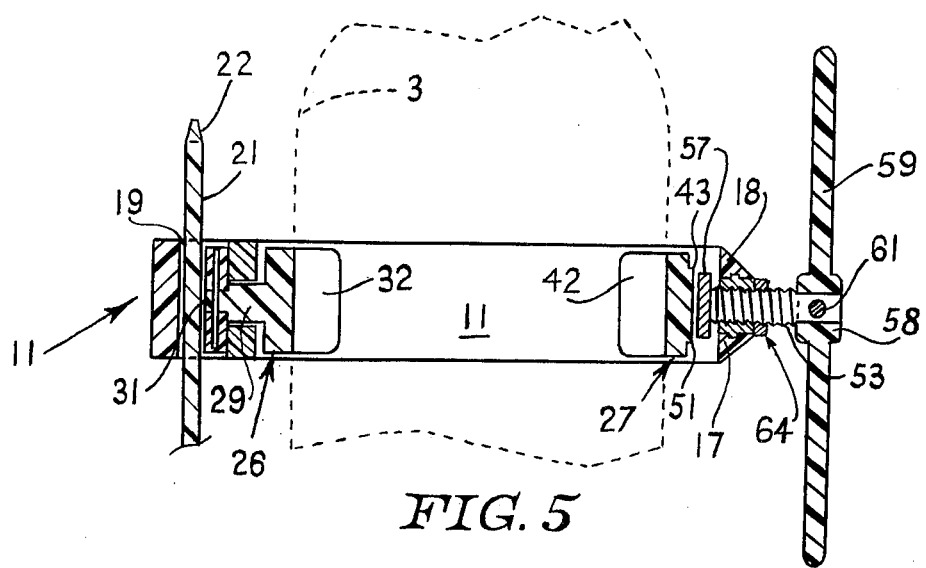
FIG. 5 is a cross-sectional view of the preferred embodiment of the invention; this view being taken on the line 5—5 of FIG. 2 and showing an encircled container in dotted lines.
Figure 6:
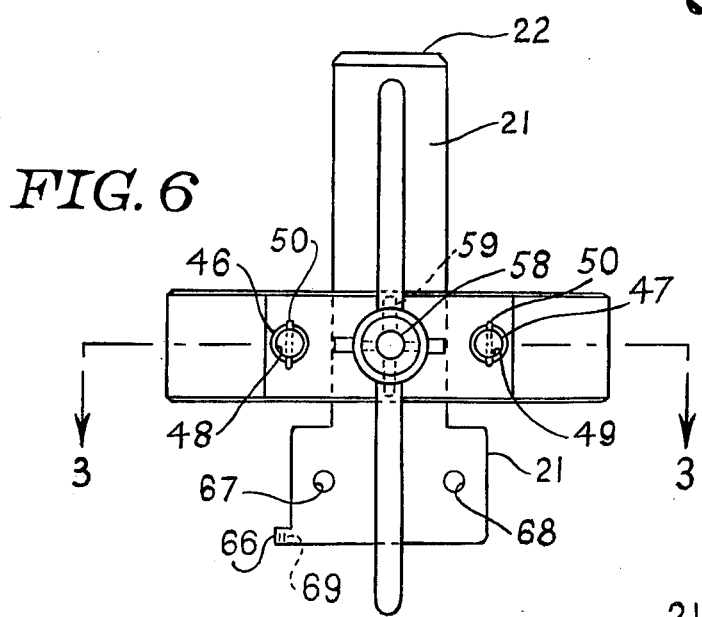
FIG. 6 is a front elevational view of a preferred embodiment of the invention.
Figure 8:
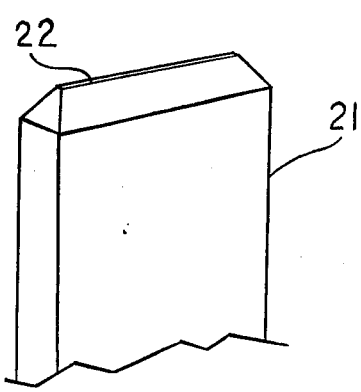
FIG. 8 is a fragmentary perspective view of the upright flat bar component of a preferred embodiment of the invention; this view illustrating the bevelled top of the bar for aiding in quick installation of my unique adjus-to-brace for gas-filled containers constraining them against displacement while being transported on mobile carriers.
Figure 7:
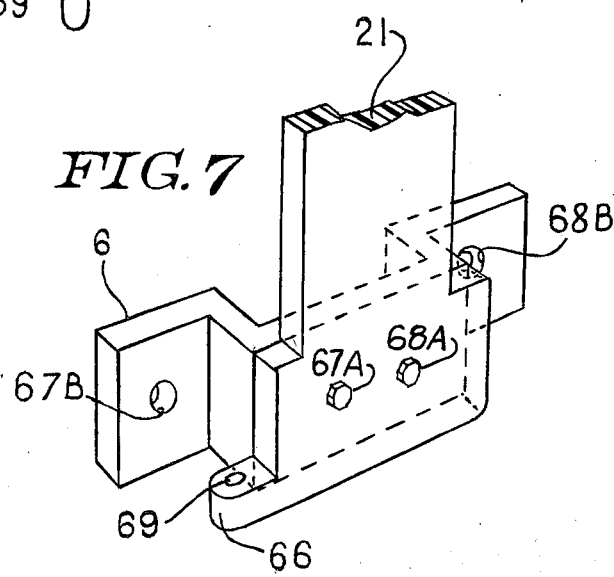
FIG. 7 is a perspective view of a type of bracket that may be employed for securing the adjus-to-brace of my invention in operative position.

With reference to FIGS. 2 and 4 inclusive of the accompanying drawings, it is to be observed that I provide means for preventing the loss of the collar 11 when not in embracing engagement with a gas-filled container 3 and while awaiting delivery of new or additional containers. As shown, I provide a lateral extension 66 on bar 21 at an enlarged bottom portion thereof and employ a bracket 6 which is utilized for securing the standard 21; such enlarged portion of the bar 21 being fashioned with a pair of spaced apart holes 67 and 68 for passing stainless steel bolts 67A and 68A which are secured onto bracket 6 with stainless steel nuts, the bracket 6 being fabricated with holes 67B and 68B which enables firm attachment to a steel wall or bulkhead or bolted onto wooden frames or welded onto angle irons. A suitable hole 69 is formed in extension 66 of the flat bar and a similar hole 70 is formed in the collar 11 adjacent to the hole 69 for passing a length of small guage steel cable 71 therethrough, the ends of which can be held together by any suitable clamp 72, thus retaining the collar 11 on the standard or upright flat bar 21.

It is to be understood that the appended claims are intended to cover not only the embodiment of the invention illustrated but also variations thereof within the scope and purview of the invention.

I claim:

1. An adjustable brace for holding a gas-filled container in an upright stabilized condition while under mobile transport; said adjustable brace comprising, in combination with a gas-filled container standing upright alongside a wall and with an upright flat bar secured to said wall in parallel spaced relation thereto, a container-encircling collar having a pair of diametrically opposite horizontally extending passages therethrough arranged in axial alignment with one another as well as having a vertically extending slot therethrough encompassing said flat bar, a pair of braces on said collar of which one of said pair of braces is movably mounted within one of said pair of horizontally extending passages and the other of said pair of braces is movably mounted within the other of said pair of horizontally extending passages, an arcuate section on each of said braces for engaging opposite sides of the periphery of said container, and means for moving said other of said pair of braces to bring said arcuate section thereof into engagement with an adjacent portion of the periphery of said container thereby bringing the arcuate section of said one brace into engagement with an opposite side portion of the periphery of said container as well as tightening the rear of said collar against said upright flat bar.

2. An adjustable brace as set forth in claim 1 wherein said means comprises a jacking-bolt rotatably mounted in said other of said pair of horizontally extending passages for advancing said other of said pair of braces into tight engagement with a portion of said container.

3. An adjustable brace as set forth in claim 1, and a pair of holes in said collar arranged in parallel spaced relationship on opposite sides of said other of said pair of horizontally extending passages in which said other brace is movably mounted, and a guide extending throught each of said pair of holes and connected to said other brace to constrain said other brace from falling from said collar.

4. An adjus-to-brace as set forth in claim 1 wherein said means comprises a jacking-bolt rotatably mounted in said other of said pair of horizontally extending passages for moving said other of said pair of braces in relation to a collar-encircled container whereby said other of said pair of braces is moved into tight engagement with an adjacent portion of said container and loosened from engagement therewith.

5. An adjustable brace as set forth in claim 2, and a shaft extension on said jacking-bolt, a hub on said shaft extension, and a handle pinned to said hub for clockwise and counter-clockwise movement to advance the arcuate section of said other of said pair of braces into engagement with an adjacent portion of the periphery of a collar-encircled container and to loosen the same from engagement therewith for ready removal of an emptied container and the replacement therefor of a gas-filled container.

6. An adjustable brace as set forth in claim 5 wherein said means comprises a jacking-bolt rotatably mounted in said other of saidk pair of horizontally extending passages.

7. An adjustable brace as set forth in claim 2, and a shaft extension on said jacking-bolt, a hub secured to said shaft extension, and a handle pinned to said hub for effecting clock-wise and counter-clockwise movement of said jacking-bolt.

* * * * *